United States Patent

[11] 3,551,640

| [72] | Inventor | John W. Duke, Jr., 610 Burnett Ferry Road, Rome, Ga. 30161 |
| --- | --- | --- |
| [21] | Appl. No. | 775,441 |
| [22] | Filed | Nov. 13, 1968 |
| [45] | Patented | Dec. 29, 1970 |

[54] BALL JOINT REBUILDER
1 Claim, 3 Drawing Figs.

[52] U.S. Cl. .................................................. 219/214,
18/3.5, 18/12; 126/343.5, 219/227, 219/380;
22/146; 228/53
[51] Int. Cl. ....................................................... B29f 1/08,
H05b 1/00
[50] Field of Search............................................ 219/420,
426, 230, 231, 214, 227, 373, 380; 18/12P, 3.5;
222/146, 146H, HE, HS; 228/53; 126/343.5;
401/1, 2; 141/82

[56] References Cited
UNITED STATES PATENTS

| 2,080,783 | 5/1937 | Petersen...................... | 18/12x(P) |
| --- | --- | --- | --- |
| 2,533,468 | 12/1950 | Jurgeleit...................... | 18/12(P,UX) |
| 2,567,960 | 9/1951 | Meyers et al. ................ | 222/146X |
| 2,702,409 | 2/1955 | Loomis........................ | 18/12(P) |
| 2,824,201 | 2/1958 | McDaniel..................... | 228/53 |
| 3,079,638 | 3/1963 | Mille ........................... | 18/12X(P) |
| 3,132,376 | 5/1964 | Ackerman.................... | 18/12(P) |
| 3,154,811 | 11/1964 | Gardener ..................... | 219/230(UX) |

*Primary Examiner*—A Bartis

ABSTRACT: A gun-like device and an especially prepared cartridge of tempered plastic for relining or rebushing a ball joint or tie rod end or other joint that does not have ball bearings or the like. The material injected with the use of this gun, is hard enough to remove the looseness and wear of a joint. This device utilizes air under pressure which drives a rod forward to remove the especially prepared plastic material from the cartridge and inject it through an adapter into the joint to be relined. The device also includes an electrically heated coil for heating the specially prepared plastic of the cartridge prior to forcing it into the joint.

PATENTED DEC 29 1970   3,551,640

INVENTOR.
*John W. Duke, Jr.*

BALL JOINT REBUILDER

SPECIFICATION

This invention relates to tools for relining ball joints and the like.

It is therefore the main purpose of this invention to provide a Ball Joint Rebuilder which will be in pit form, containing an electric-heating cord and a plurality of cartridges having an especially prepared tempered plastic as cores.

Another object of this invention is to provide a Ball Joint Rebuilder which will be used to reline or rebush a ball joint or a tie rod and other joints that do not have ball bearings.

A further object of this invention is to provide a Ball Joint Rebuilder which will have piston means and rod means within a cylinder which will be driven by air under pressure towards the cartridge, the push rod attached to the piston being the drive means for forcing the tempered plastic after it is heated by the heating coil, from the cartridge into the joint to be relined.

Other objects of this invention are to provide a Ball Joint Rebuilder which is simple in design, inexpensive to manufacture, rugged in construction, easy to use and efficient in operation.

These and other objects will become readily apparent upon a study of the following specification together with the accompanying drawing wherein.

Figure 1:
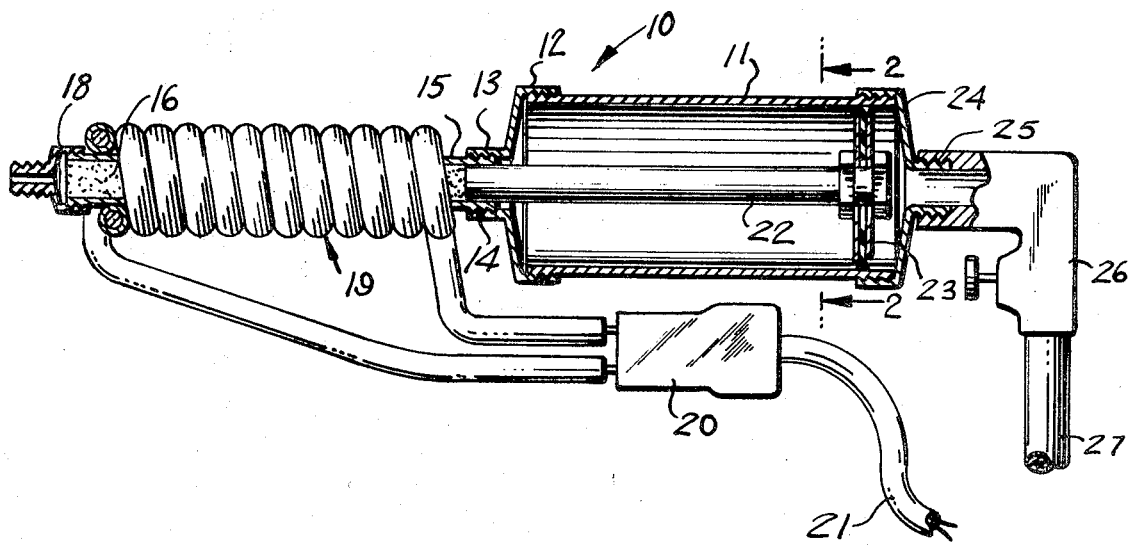
FIG. 1 is a side view of the present invention shown in elevation and partly broken away.
Figure 2:
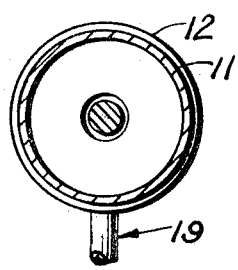
FIG. 2 is a transverse view taken along the lines 2–2 of FIG. 1.
Figure 3:
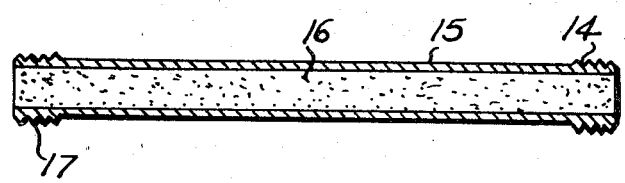
FIG. 3 is a horizontal view of the cartridge shown removed from the invention and is shown in elevation and in section.

According to this invention, a Ball Joint Rebuilder 10 is provided with a hollow cylinder 11 which threadingly receives a cap 12 at one end. Cap 12 is provided with an internally threaded neck 13, which will receive the external threads 14 of the cartridge 15. Cartridge 15 carries on its interior a specially prepared tempered plastic 16 which is to be forced into a joint (not shown). The opposite end of cartridge 15 is provided with external threads 17 which receive the adapter 18 which is used for fitting different alemite openings in the joint to be realigned. A heating coil 19 is used to encompass the cartridge 15 in order to heat its contents and heating coil 19 is plugged into plug 20 of extension cord 21 which will be plugged into an electric outlet, or the like.

A push rod 22 within cylinder 11 is attached to a piston 23 and provides a means of forcing the plastic 16 after it is heated, into the joint to be serviced. A cap 24 is threaded onto the other end of cylinder 11 and is provided with an externally threaded net 25 which receives the air control valve 26. Air control valve 26 is secured to the air line 27.

In use, the adapter 18 connects the cartridge 15 to a ball joint or tie rod end by removing the alemite grease fitting and inserting either the adapter 18 or the cartridge 15 into the opening. The heating coil 19 is slipped over the cartridge 15 which is screwed into the neck 13 of cap 12 of gun 10. The heating coil 19 is allowed to heat for a specified time and then the air under pressure is released by opening the air control valve 26. When this occurs, the compressed air forces piston 23 towards the opposite end of cylinder 11 and in doing so, carries the attached push rod 22 forward which enters cartridge 15 and forces the specially prepared plastic 16 into the ball joint or tie rod end whereupon the joint become relined.

It will be noted that cartridge 15 may be refilled or replaced.

It shall further be noted that after injecting the tempered plastic 16 into the joint, the joint is ready for use and the empty cartridge 15 is then removed and a refilled cartridge 15 is inserted into gun 10.

While various changes may be made within the detailed construction, it is understood that such changes will be within the spirit and scope of the present invention as is defined by the appended claims.

I claim:

1. In a Ball Joint Rebuidler, the combination of an assembly comprised of a hollow cylinder having a slideable piston therewithin, said cylinder comprising a cylindrical sidewall having a first end cap mounted on one end thereof and a second end cap secured to the other end thereof, said first end cap having a central opening therethrough, said first end cap having an outward extending threaded nipple with said central opening extending therethrough, said nipple being threadingly engaged to an air control valve, said air control valve being secured to one end of an air line, the opposite end of said air line being connected to a compressed air source, said second end cap having a central upwardly extending nipple having an internal thread, a push rod having one end thereof secured to said piston, the opposite end of said push rod being fitted through a central opening of said second end cap nipple, an electrical-heating coil positioned in front of said second end cap nipple, said heating coil having a central axis which is on the same axis of said push rod, the opposite ends of said electrical-heating coil being connected to a plug, said plug being connected to one end of an extension cord, the opposite end of said extension cord being connected to an electrical power source, and a cartridge of elongated type being receivable through said electrical-heating coil, said cartridge comprising a straight tube open at its opposite ends and containing therewithin a specially prepared tempered plastic material, the opposite ends of said cartridge being externally threaded, one of said externally threaded ends being removably attachable with said internal thread of said second end cap nipple, the opposite threaded end of said cartridge being threadingly engageable with an adapter having a restricted opening in the end thereof and through which said plastic is dispensed, said heating coil receiving said cartridge having an internal diameter that is generally equivalent to the outer diameter of said cartridge so as to transmit heat through said cartridge for melting said plastic.